US012771141B2

(12) United States Patent
Mesanovic et al.

(10) Patent No.: US 12,771,141 B2
(45) Date of Patent: Oct. 20, 2026

(54) COMPUTER-IMPLEMENTED METHOD, COMPUTER-IMPLEMENTED TOOL AND POWER PLANT CONTROL DEVICE FOR ENERGY BALANCING SOLAR POWER PLANTS AND A SOLAR POWER PLANT SYSTEM

(71) Applicant: Siemens Aktiengesellschaft, Munich (DE)

(72) Inventors: Amer Mesanovic, Munich (DE); Andrei Szabo, Ottobrunn (DE); Joachim Bamberger, Stockdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 402 days.

(21) Appl. No.: 18/387,575

(22) Filed: Nov. 7, 2023

(65) Prior Publication Data

US 2024/0178672 A1 May 30, 2024

(30) Foreign Application Priority Data

Nov. 17, 2022 (EP) .................................... 22208077

(51) Int. Cl.
*H02J 3/46* (2026.01)
*H02J 3/00* (2026.01)
*H02J 101/24* (2026.01)

(52) U.S. Cl.
CPC ................ *H02J 3/46* (2013.01); *H02J 3/004* (2020.01); *H02J 2101/24* (2026.01)

(58) Field of Classification Search
CPC .......... H02J 3/46; H02J 3/004; H02J 2101/24; H02J 2103/30; H02J 3/381
See application file for complete search history.

(56) References Cited

U.S. PATENT DOCUMENTS

2018/0073980 A1 3/2018 Caine
2020/0186083 A1 6/2020 Buenemann
2022/0021850 A1* 1/2022 Irish ......................... H02J 7/35

FOREIGN PATENT DOCUMENTS

CN 112531694 A 3/2021

* cited by examiner

*Primary Examiner* — Chad G Erdman
(74) *Attorney, Agent, or Firm* — Schmeiser Olsen PLLC

(57) ABSTRACT

A computer-implemented method, computer-implemented tool and power plant control device for energy balancing solar power plants and a solar power plant system is provided.

12 Claims, 5 Drawing Sheets

COMPUTER-IMPLEMENTED METHOD, COMPUTER-IMPLEMENTED TOOL AND POWER PLANT CONTROL DEVICE FOR ENERGY BALANCING SOLAR POWER PLANTS AND A SOLAR POWER PLANT SYSTEM

CROSS-REFERENCE TO RELATED APPLICATIONS

This application claims priority to EP Application No. 22208077.2, having a filing date of Nov. 17, 2022, the entire contents of which are hereby incorporated by reference.

FIELD OF TECHNOLOGY

The following refers to a computer-implemented method for energy balancing solar power plants, a computer-implemented tool for energy balancing solar power plants, a power plant control device for energy balancing solar power plants and a solar power plant system.

BACKGROUND

When operating solar power plants there are many reasons for power losses in the solar power plants by <i> "Photo-Voltaic <PV>" generators, such as failures of components such as inverters, PV strings, measurement devices etc., <ii> curtailment with a controlled reduction of solar power production, <iii> clipping when a "Direct Current <DC>" power output of the PV strings is higher than the inverter power rating) or <iv> shading etc.

For this reason, it is useful to quantify how much electrical energy, which means how much money, would be lost due to a reduced power output of a solar power plant. This enables an adjustment of a solar power plant control, an adaption of maintenance activity etc.

Up to now, this quantification problem was solved by manual observation of solar power plant production values and comparison with production values in previous months and/or years.

SUMMARY

An aspect relates to a computer-implemented method, a computer-implemented tool and a power plant control device for energy balancing solar power plants as well as a solar power plant system, by which energy losses of the solar power plants are determined and reliably quantified so that their impacts on energy outputs of the solar power plants could be reduced.

This aspect is solved based on a computer-implemented method defined in the preamble of claim 1 by the features in the characterizing part of claim 1.

The aspect is further solved based on a computer-implemented tool defined in the preamble of claim 6 by the features in the characterizing part of claim 6.

The aspect is solved furthermore based on a power plant control device defined in the preamble of claim 11 by the features in the characterizing part of claim 11.

The aspect is solved moreover based on a solar power plant system defined in the preamble of claim 12 by the features in the characterizing part of claim 12.

The main idea of embodiments of the invention according to the claims 1, 6, 11 and 12 in order to do an energy balancing of solar power plants, when for an energy accounting time period of a solar power plant, in which over a recording time "[$t_0$ to $t_n$]" with $n \in \mathbb{N}_0$ corresponding to the energy accounting time period, regarding an irradiation by measuring an irradiation measurement signal "I(t)", a set of irradiation measurement values "$I(t_0)$" to "$I(t_n)$" and, regarding a generated power by measuring a power production measurement signal "P(t)" a set of power production measurement values "$P(t_0)$" to "$P(t_n)$" are collected, is to

- match for the recording time "[$t_0$ to $t_n$]" the power production measurement signal "P(t)" to the irradiation measurement signal "I(t)" by using a curve matching algorithm to identify based on the set of power production measurement values "$P(t_0)$" to "$P(t_n)$" and the set of irradiation measurement values "$I(t_0)$" to "$I(t_n)$" being collected at least one good matching time, in which the power production measurement signal "P(t)" and the irradiation measurement signal "I(t)" match optimally through a minimum signal distance,
- run a fitting algorithm, in particular a robust least squares fit algorithm, for the at least one good matching time and based <i> regarding a "good matching time"-related part of the power production measurement signal "$P_{GMT}(t)$" ($PPMS_{GMT}$) on a subset of the set of power production measurement values "$P_t(t_0)$" to "$P_i(t_n)$" and <ii> regarding a "good matching time"-related part of the irradiation measurement signal "$I_{GMT}(t)$" on a subset of the set of irradiation measurement values "$I(t_0)$" to "$I(t_n)$" ($SIMV_{SS}$) to generate according to an estimated power production measurement signal "$P_{est}(t, K)$" defined as a function "f(I(t),K)" with "$P_{est}(t, K)=f(I(t), K=[k_0, k_1, \ldots])$" a parameter set "K" with at least one parameter "[$k_0$, $k_1$, . . . ]", in which when running the fitting algorithm a deviation between the power production measurement signal "P(t)" and the estimated power production measurement signal "Pest(t, K)" is minimized by tuning or changing the parameter set "K",
- calculate for the recording time "[$t_0$ to $t_n$]" based on <1> the set of power production measurement values "$P(t_0)$" to "$P(t_n)$", <2> the set of irradiation measurement values "$I(t_0)$" to "$I(t_n)$" (SIMV) and <3> the generated parameter set "K" with the at least one parameter "[$k_0$, $k_1$, . . . ]" the estimated power production measurement signal "$P_{est}(t, K)$" in order to determine a value for an energy loss by an integral calculation of a power difference $$\int [P_{est}(t, K) - P(t)]dt.$$

Further advantages arise out of additional developments of embodiments of the invention according to the independent claims.

I. So, according to the claims 2 and 7 the curve matching algorithm to identify the at least one good matching time is iterative based, in which following primary steps "$S1_p$" to "$S6_p$" of the curve matching algorithm are carried out, wherein the steps "$S3_p$" to "$S5_p$" are done iteratively.

In a first primary step "$S1_p$" the power production measurement signal "P(t)" with the set of power production measurement values "$P(t_0)$" to "$P(t_n)$" and the irradiation measurement signal "I(t)" with the set of irradiation measurement values "$I(t_0)$" to "$I(t_n)$" are fed to the curve matching algorithm.

In a next second primary step "$S2_p$" a candidate set for good matching to the recording time "[$t_0$ to $t_n$]" are set.

In a further third primary step "$S3_p$" a scaling factor "s" by solving a first optimization problem to $$\min_{s} \sum_{t \in candidate\ set} (P(t) - sI(t))^2$$

is calculated.

Then, in a fourth primary step "$S4_p$" time points from the candidate set for good matching are included, wherein all of the following criteria between a "P(t)"-value and a "sI(t)"-value for "t" in the recording time "[$t_0$ to $t_n$]" are satisfied

- A deviation between the values is smaller than a first threshold value
- A difference of variabilities of the values is smaller than a second threshold value.

Moreover, in a fifth primary step "$S5_p$" following the mentioned iteration it is going back to the third primary step "$S3_p$" until the candidate set for good matching ($CS_{GM}$) remains unchanged according to the fourth primary step "$S4_p$".

Finally, in a sixth primary step "$S6_p$" the at least one good matching time corresponding to the candidate set is outputted after the last iteration of the fifth primary step "$S5_p$".

The result of this iterative approach is depicted in FIG. 4.

II. So, according to the claims 3 and 8 the fitting algorithm is a robust least squares fit algorithm to generate the parameter set "K" with the at least one parameter "[$k_0$, $k_1$, . . . ]" is also iterative based, in which following secondary steps "$S1_S$" to "$S5_S$" of the robust least squares fit algorithm are carried out, wherein the steps "$S2_S$" to "$S4_S$" are done iteratively.

In a first secondary step "$S1_S$" the "good matching time"-related part of the power production measurement signal "$P_{GMT}(t)$" with the subset of the set of power production measurement values "$P(t_0)$" to "$P(t_n)$" and the "good matching time"-related part of the irradiation measurement signal "$I_{GMT}(t)$" on the subset of the set of irradiation measurement values "$I(t_0)$" to "$I(t_n)$" are fed into the robust least squares fit algorithm.

In a next second secondary step "$S2_S$" a further parameter set "K*" by solving a second optimization problem to $$K^* = \underset{K^*}{\operatorname{argmin}} \sum_{t \in good\ matching\ times} (P(t) - P_{est}(t, K^*))^2$$

is calculated, wherein $P_{est}$ is a function of time "t" and the further parameter set "K*" with $P_{est}(t, K^*)=f(I(t), K^*)$".

In a further third secondary step "$S3_S$" the further parameter set "K*" is used to calculate a set of quadratic deviations as $[(P(t)-P_{est}(t, K^*))^2 \ldots]$ for all "t∈good matching times". Then also in this third secondary step "$S3_S$" a percentage share of the times, e.g., 10%, from the good matching times corresponding to the highest values in the set of quadratic deviations are eliminated.

Moreover, in a fourth secondary step "$S4_S$" following the mentioned iteration it is going back to the second secondary step "$S2_S$" until a specified number of iterations, e.g., 3 iterations, is achieved.

Finally, in a fifth secondary step "$S5_S$" the parameter set "K" corresponding to the further parameter set "K*" is outputted after the last iteration of the fourth secondary step "$S4_S$".

The result of this iterative approach is depicted in FIG. 5.

III. So, according to the claims 4 and 9 the function "f(I(t),K)" with K=[$k_0$, $k_1$, . . . ] the estimated power production measurement signal "$P_{est}(t, K)$" is calculated by is a linear function "$P_{est}(t, k_0)=I(t)$" or a quadratic function "$P_{est}(t, k_0, k_1)=k_0 I(t)+k_1 I(t)^2$".

IV. So, according to claims 5 and 10 it is beneficial that a control information is generated and used to control reductions of impacts concerning the calculated energy loss on the solar power plant.

BRIEF DESCRIPTION

Some of the embodiments will be described in detail, with reference to the following figures, wherein like designations denote like members, wherein.

DETAILED DESCRIPTION

Figure 1:
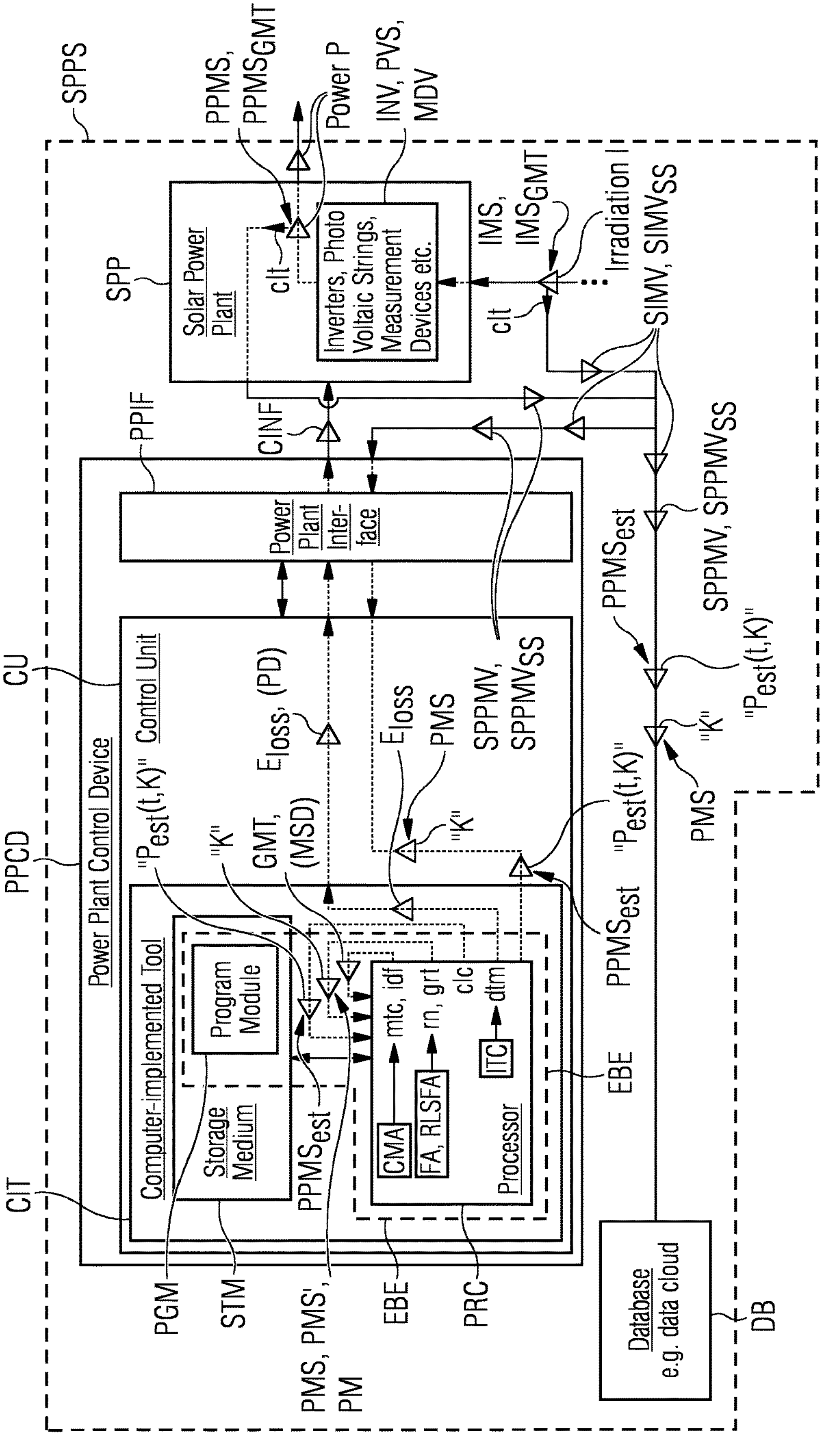
FIG. 1 shows a solar power plant system for energy balancing solar power plants as an "implementation-concept"

FIG. 1 shows a solar power plant system SPPS for energy balancing a solar power plant SPP including various components such as inverters INV, "Photo-Voltaic <PV>" generators designed as PV strings PVS and measurement devices etc., as an "implementation-concept". When operating the solar power plant SPP and at least one the these component fails during operation this is reflected in a drop of performance concerning a generated power P of the solar power plant SPP from an irradiation I which is hitting the solar power plant SPP and at least one of a "Global Horizontal Irradiance <GHI>" and a "Plan Of Array Irradiance <POA Irradiance>".

The drop of performance corresponds when cumulated over a time frame in a loss of energy. As stated in the beginning of the present application there are more reasons for such energy losses, which are useful to be quantified in the course of energy balancing the solar power plant SPP.

The depicted solar power plant system SPPS includes, besides the solar power plant SPP with the cited components INV, PVS, MDV as a central component for energy balancing the solar power plant SPP a power plant control device PPCD and moreover a database DB, which is designed as a data cloud.

One of the usual goals of the power plant control device PPCD is to enable a requested output, e.g., by an electrical consumer being connectable to the solar power plant SPP, of the generated power P. For this goal and the cited purposes, the power plant control device PPCD includes a control unit CU and a power plant interface PPIF, wherein the corresponding control of the solar power plant SPP is carried out by the control unit CU via the power plant interface PPIF.

Furthermore, in the context of the balancing task of the solar power plant system SPPS the power plant control device PPCD with the cited two components, the control unit CU and the power plant interface PPIF, is also responsible for energy balancing the solar power plant SPP. Therefore, according to the "implementation-concept" depicted in FIG. 1 the control unit CU includes a computer-implemented tool CIT which is implemented as a sub-unit in the control unit CU. The computer-implemented tool CIT is a computer-program-product which is designed as an application software, called as APP, that allows, when it is implemented, to perform special tasks. So, in the present case of the control unit CU, where the computer-program-product respectively the APP is implemented, the computer-implemented tool CIT is used for energy balancing the solar power plant SPP.

To this end the computer-implemented tool CIT comprises a non-transitory, processor-readable storage medium STM, in which processor-readable program-instructions of a program module PGM are stored. This program module PGM is used for energy balancing the solar power plant SPP. Moreover, the computer-implemented tool CIT comprises a processor PRC connected with the storage medium STM executing the processor-readable program-instructions of the program module PGM to energy balance the solar power plant SPP, wherein the program module PGM and the processor PRC form an energy balancing engine EBE for doing this energy balancing.

Figure 2:
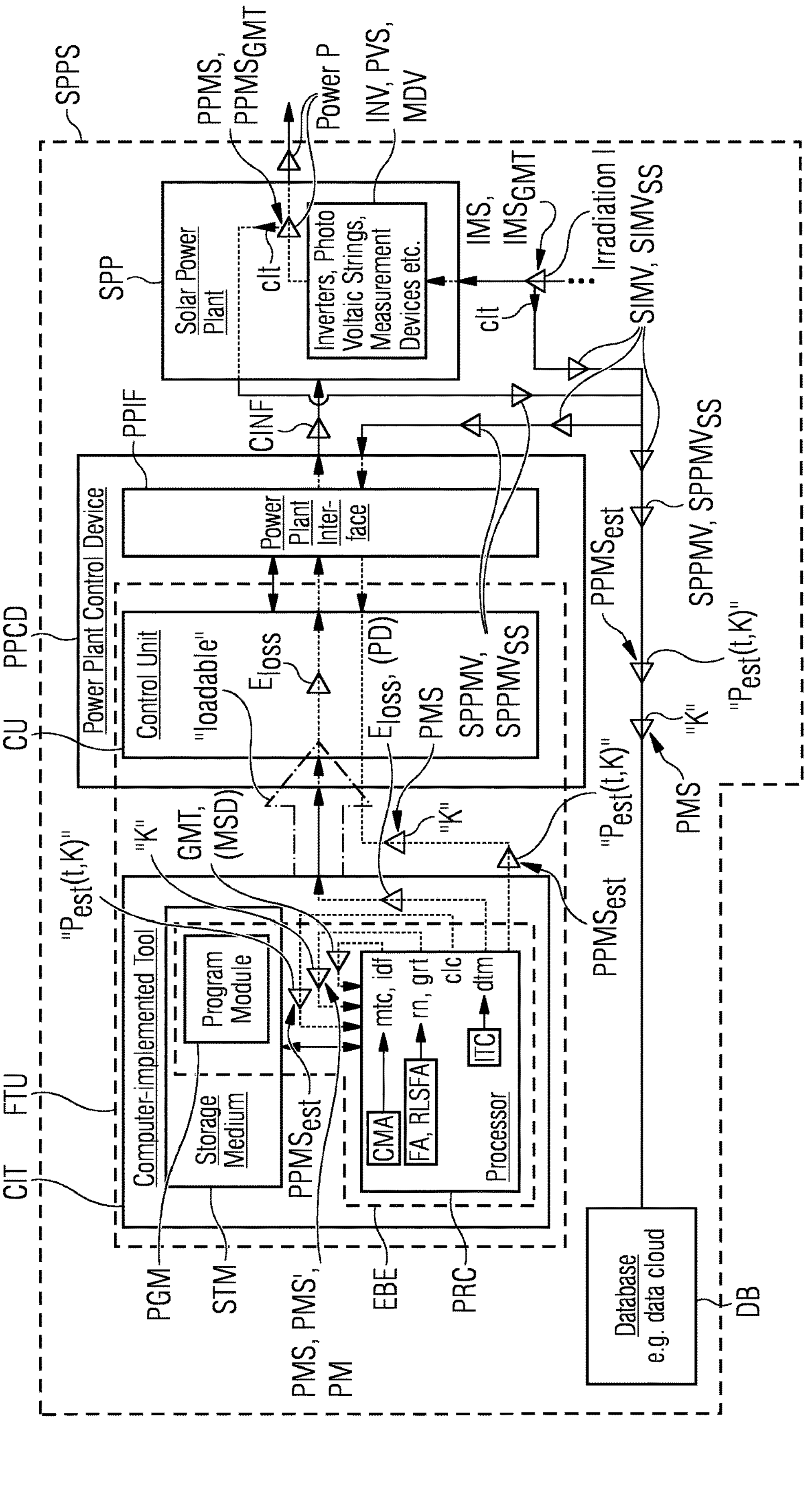
FIG. 2 shows a solar power plant system for energy balancing solar power plants as a "functional-unit-concept"

FIG. 2 shows a solar power plant system SPPS for energy balancing a solar power plant SPP including various components such as inverters INV, "Photo-Voltaic <PV>" generators designed as PV strings PVS and measurement devices etc., as a "functional-unit-concept". Again when operating the solar power plant SPP and at least one the these component fails during operation this is reflected in a drop of performance concerning a generated power P of the solar power plant SPP from an irradiation I which is hitting the solar power plant SPP and at least one of a "Global Horizontal Irradiance <GHI>" and a "Plan Of Array Irradiance <POA Irradiance>".

The drop of performance corresponds again when accumulated over a time frame in a loss of energy. As stated in the beginning of the present application there are more reasons for such energy losses, which are useful to be quantified in the course of energy balancing the solar power plant SPP.

The depicted solar power plant system SPPS includes again, besides the solar power plant SPP with the cited components INV, PVS, MDV as a central component for energy balancing the solar power plant SPP a power plant control device PPCD and moreover a database DB, which is designed as a data cloud.

Again, one of the usual goals of the power plant control device PPCD is to enable a requested output, e.g., by an electrical consumer being connectable to the solar power plant SPP, of the generated power P. For this goal and the cited purposes, the power plant control device PPCD includes a control unit CU and a power plant interface PPIF, wherein the corresponding control of the solar power plant SPP is carried out by the control unit CU via the power plant interface PPIF.

Furthermore, in the context of the balancing task of the solar power plant system SPPS the power plant control device PPCD with the cited two components, the control unit CU and the power plant interface PPIF, is again also responsible for energy balancing the solar power plant SPP. Therefore, according to the "functional-unit-concept" depicted in FIG. 2 the control unit CU does not include the computer-implemented tool CIT. Instead, the Computer-implemented tool CIT forms a functional unit FTU with the control unit CU. This functional unit FTU is designed such that the Computer-implemented tool CIT is either loadable into the control unit CU according to the depiction in the FIG. 2 or forms either (not depicted in the FIG. 2) a cloud-based, centralized platform, e.g. a server, for the power plant control device PPCD or a decentralized platform, e.g. a server, for the power plant control device PPCD with a mutual access within the functional unit between the control unit CU and the Computer-implemented tool CIT.

In each of cited variants of realization the computer-implemented tool CIT is again a computer-program-product which in the case upload-functionality is again designed as an application software, called as APP, that allows, when it is implemented, to perform special tasks. So, in the present case of the control unit CU, when the computer-program-product respectively the APP is uploaded, the power plant control device PPCD with uploaded computer-implemented tool CIT is used for detecting the power production degradation of the solar power plant SPP.

To this end the computer-implemented tool CIT comprises again a non-transitory, processor-readable storage medium STM, in which processor-readable program-instructions of a program module PGM are stored. This program module PGM is used for energy balancing the solar power plant SPP. Moreover, the computer-implemented tool CIT comprises again a processor PRC connected with the storage medium STM executing the processor-readable program-instructions of the program module PGM to energy balance the solar power plant SPP, wherein the program module PGM and the processor PRC form again an energy balancing engine EBE for doing this energy balancing.

Figures 3, 3A, 3B:
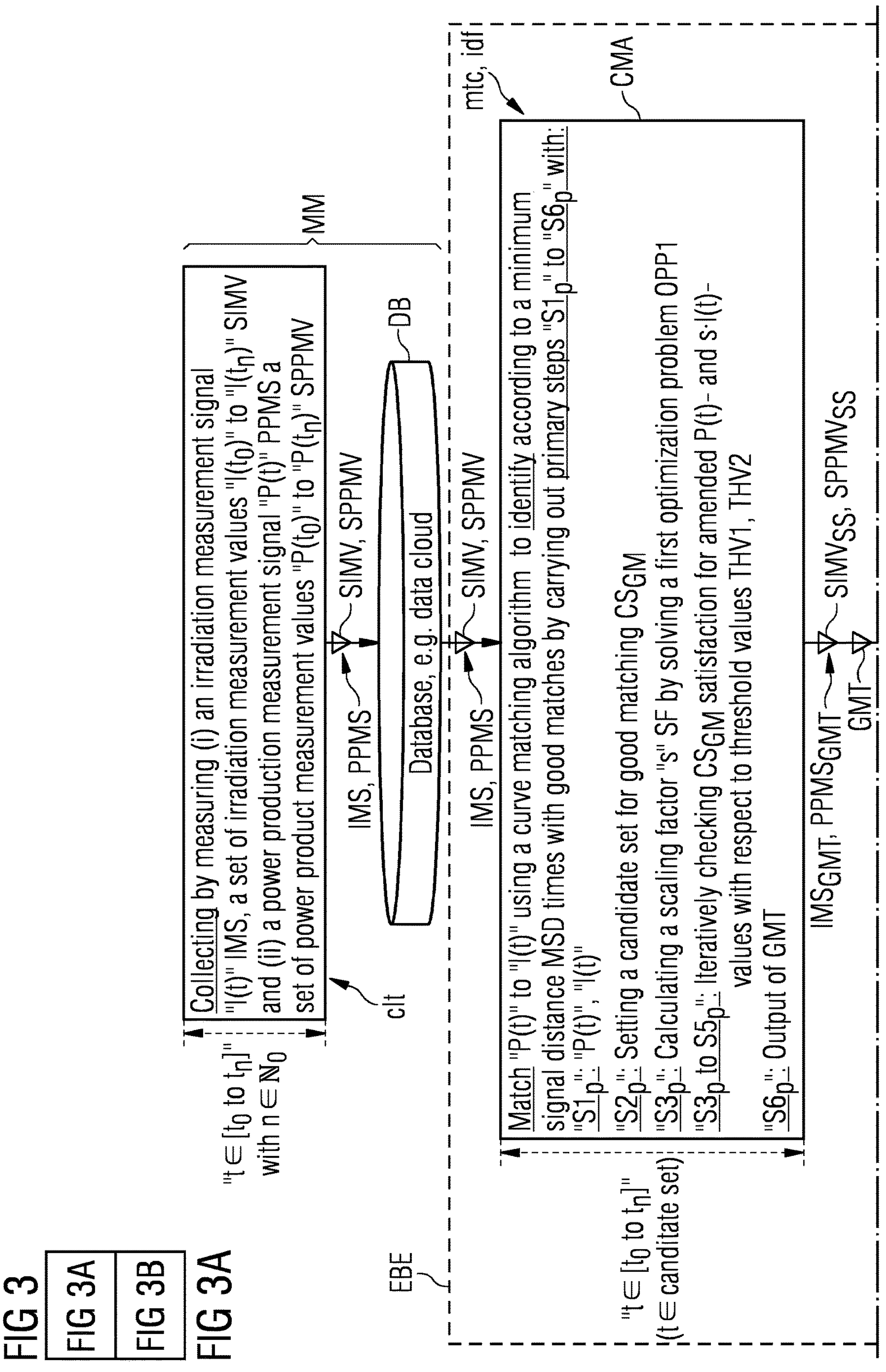
FIG. 3A shows a flowchart of a process to determine an energy loss in the course of energy balancing solar power plants.
FIG. 3B shows a flowchart of a process to determine an energy loss in the course of energy balancing solar power plants.
Figure 3B:
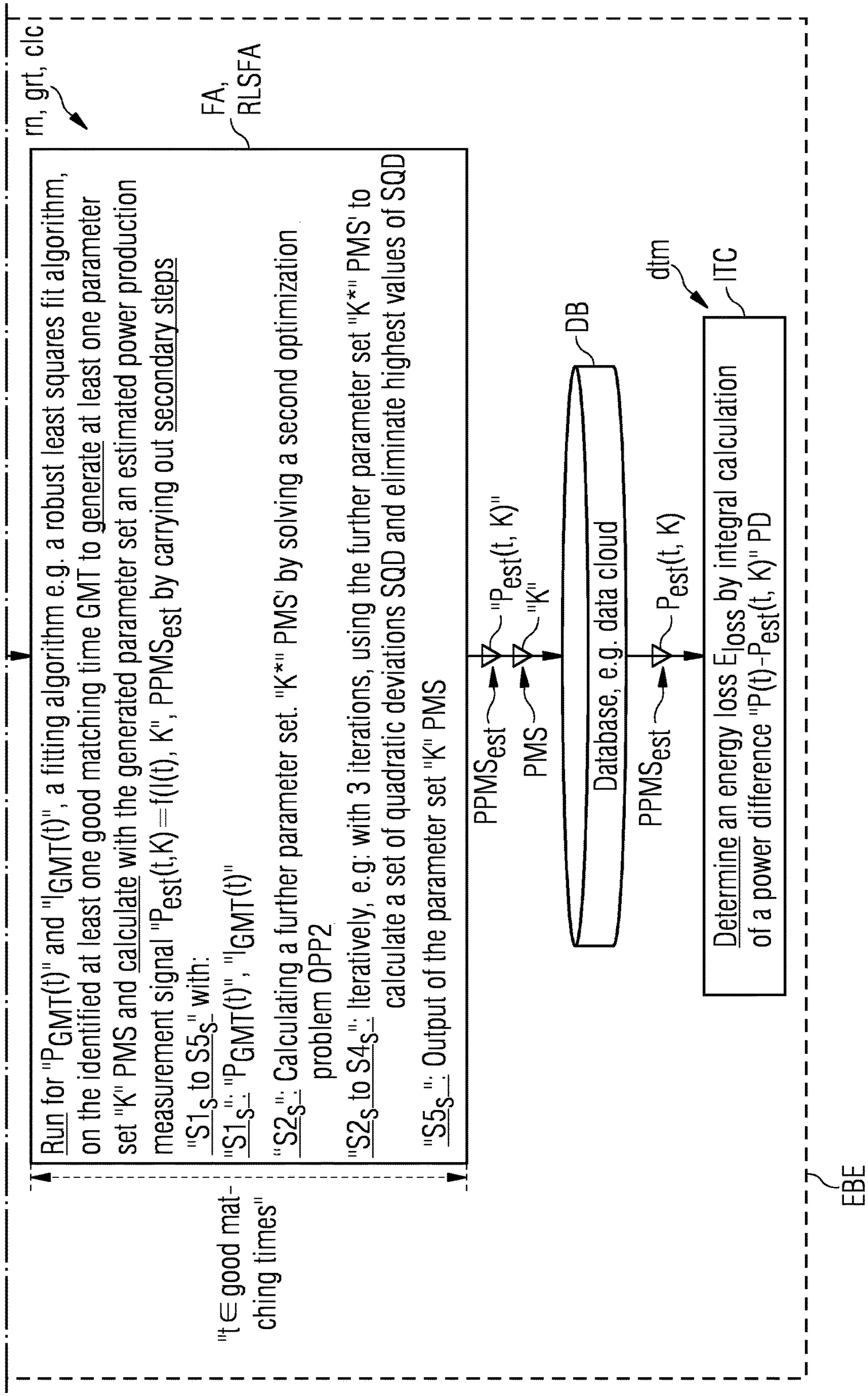

The energy balancing for both concepts, the "implementation-concept" and the "functional-unit-concept" is generally based on various measurements MM (cf. FIG. 3). The measurements take place over a recording or measurement time "[$t_0$ to $t_n$]" with $n \in \mathbb{N}_0$ corresponding to an energy accounting time period EATP, which could be for example one day with a one hour based recording time "[$t_0$=0 h to $t_{23}$=23 h]". For this recording or measurement time "[$t_0$ to $t_n$]" respectively the energy accounting time period EATP there are collected clt (i)—by measuring regarding the irradiation I, which is based on a measured plane-of-array irradiation, an irradiation measurement signal "I(t)" IMS—a set of irradiation measurement values "I($t_0$)" to "I($t_0$)" SIMV and (ii)—by measuring regarding the generated power P, which is based on a measured power of the complete solar power plant SPP, INV, PVS, MDV or at least one part of the cited solar power plant components such as the inverter INV, the "Photo-Voltaic <PV>"-string PVS or the measurement device MDV, a power production measurement signal "P(t)" PPMS—a set of power production measurement values "P($t_0$)" to "P($t_n$)" SPPMV.

Remark: If according to (i) above the "Global Horizontal Irradiance <GHI>" or any other diffuse irradiation can be measured, the irradiation measurement values could be transformed with state-of-the-art methods to the plane-of-array measurements.

When the measurement signals IMS, PMS with the corresponding measured values SIMV, SPPMV are measured independently or time shifted from the energy balancing process itself, they can be stored meanwhile or intermediately in the database DB before they are inputted into, supplied to or retrieved from the processor PRC via the power plant interface PPIF and the control unit CU. Otherwise they are inputted directly into, supplied directly to or retrieved directly from the processor PRC via the power plant interface PPIF and the control unit CU.

Figure 4:
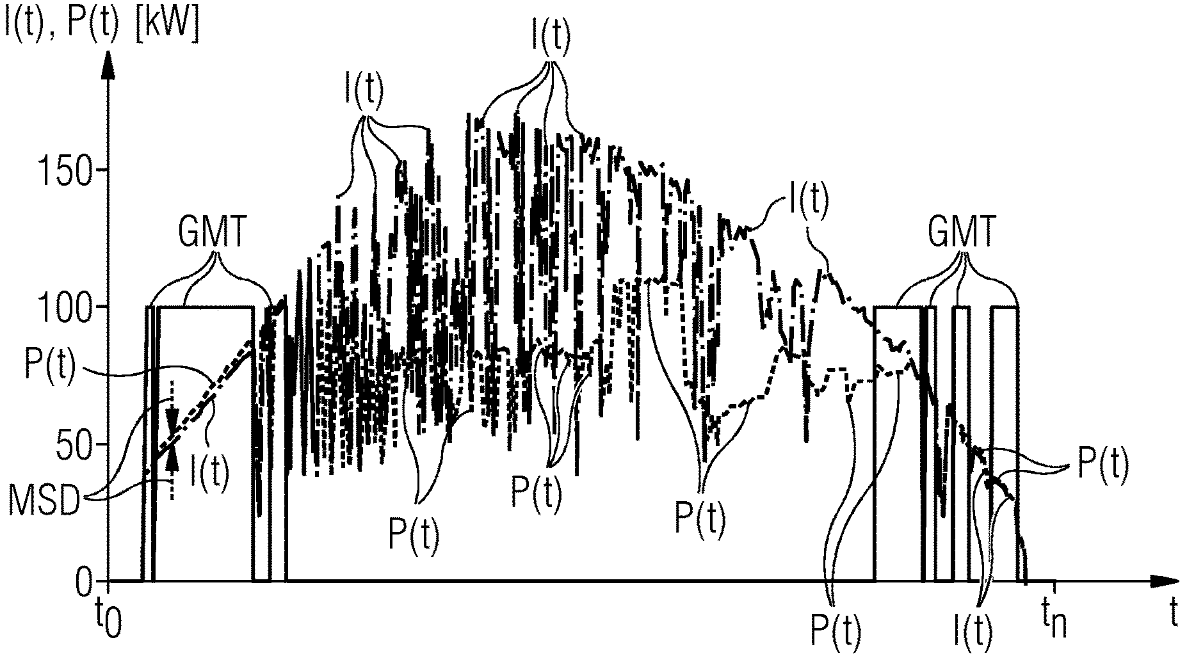
FIG. 4 shows a visualizing chart depicting an irradiation measurement signal "I(t)" and a power production measurement signal "P(t)"

For doing now based on the described measurements MM (cf. FIG. 3) the cited energy balancing of the solar power plant SPP—according to a flowchart of a process to determine an energy loss in the course of energy balancing solar power plants in FIG. 3—the energy balancing engine EBE formed by the processor PRC and the program module PGM are doing the following:

(1) Matching mtc for the recording time "[$t_0$ to $t_n$]" the power production measurement signal "P(t)" PPMS to the irradiation measurement signal "I(t)" IMS by using a curve matching algorithm CMA (cf. FIG. 3) to identify idf based on the set of power production measurement values "P($t_0$)" to "P($t_n$)" SPPMV and the set of irradiation measurement values "I($t_0$)" to "I($t_n$)" SIMV being collected clt at least one good matching time GMT, in which the power production measurement signal "P(t)" PPMS and the irradiation measurement signal "I(t)" IMS match optimally through a minimum signal distance MSD (cf. FIG. 4).

(2) Running rn a fitting algorithm FA, e.g., a robust least squares fit algorithm RLSFA, (cf. FIG. 3) for the at least one good matching time GMT and based <1> regarding a "good matching time"-related part of the power production measurement signal "$P_{GMT}$(t)" $PPMS_{GMT}$ on a subset of the set of power production measurement values "$P_i$($t_0$)" to "$P_i$($t_n$)" $SPPMV_{SS}$ and <2> regarding a "good matching time"-related part of the irradiation measurement signal "$I_{GMT}$ (t)" $IMS_{GMT}$ on a subset of the set of irradiation measurement values "I($t_0$)" to "I($t_n$)" $SIMV_{SS}$ to generate grt according to an estimated power production measurement signal "$P_{est}$(t, K)" $PPMS_{est}$ defined as a function "f(I(t),K)" with "$P_{est}$(t, K)=f(I(t), K=[k0, k1, . . . ]) a parameter set "K" (PMS) with at least one parameter "[$k_0$, $k_1$, . . . ]" PM, in which when running rn the fitting algorithm FA a deviation between the power production measurement signal "P(t)" PPMS and the estimated power production measurement signal "$P_{est}$(t, K)" $PPMS_{est}$ is minimized by tuning or changing the parameter set "K" PMS.

Figure 5:
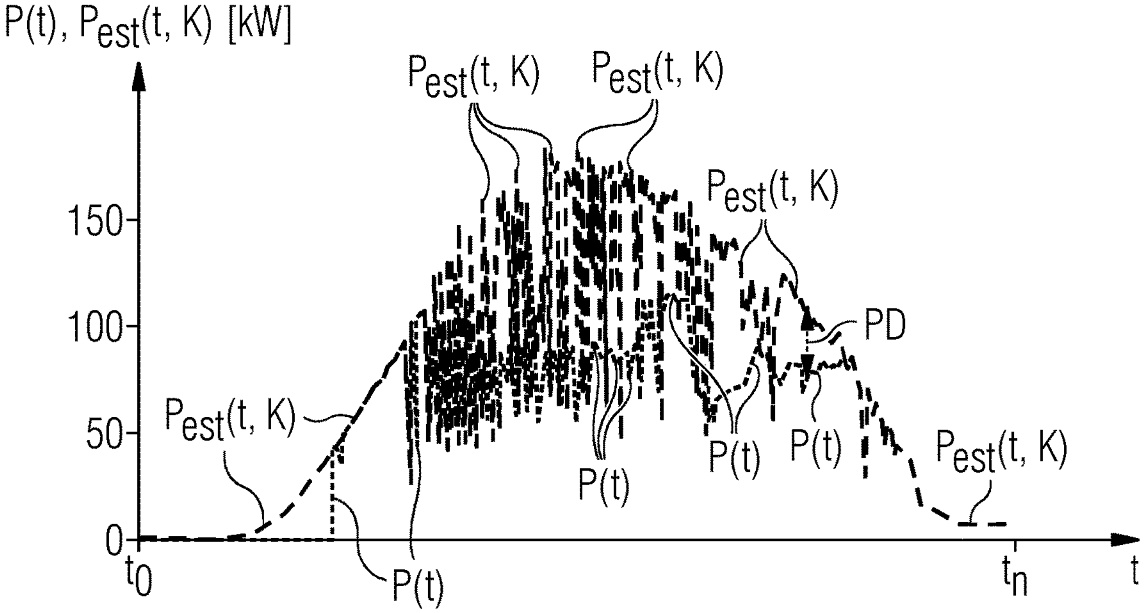
FIG. 5 shows a visualizing chart depicting a power production measurement signal "P(t)" and an estimated power production measurement signal "$P_{est}(t, K)$".

(3) Calculating clc for the recording time "[$t_0$ to $t_n$]" based on <a> the set of power production measurement values "P($t_0$)" to "P($t_n$)" SPPMV, <b> the set of irradiation measurement values "I($t_0$)" to "I($t_n$)" SIMV and <c> the generated parameter set "K" PMS with the at least one parameter "[$k_0$, $k_1$, . . . ]" PM the estimated power production measurement signal "$P_{est}$(t, K)" $PPMS_{est}$ in order to determine dtm a value for an energy loss $E_{loss}$ by an integral calculation ITC (cf. FIG. 3) of a power difference PD (cf. FIG. 5)

$$\int [P(t, K) - P_{est}(t, K)]dt.$$

According to FIG. 3 both parameter set "K" PMS and the estimated power production measurement signal "$P_{est}$(t, K)" $PPMS_{est}$ can be stored in the database DB.

The cited function "f(I(t),K)" with K=[$k_0$, $k_1$, . . . ] the estimated power production measurement signal "$P_{est}$(t, K)" $PPMS_{est}$ is calculated by is a linear function "$P_{est}$(t, $k_0$)=I(t)" or a quadratic function "$P_{est}$(t, $k_0$, $k_1$)=$k_0$ I(t)+$k_1$ I(t)$^{2}$".

Besides that, it is beneficial when the energy balancing engine EBE formed by the processor PRC and the program module PGM is designed such that a control information CINF is generated and used to control reductions of impacts concerning the calculated energy loss $E_{loss}$ on the solar power plant SPP.

Moreover—according to the flowchart of the process to determine the energy loss in the course of energy balancing solar power plants in the FIG. 3—for extending the cited energy balancing of the solar power plant SPP the energy balancing engine EBE formed by the processor PRC and the program module PGM is designed advantageously such that the curve matching algorithm CMA (cf. FIG. 3) to identify idf the at least one good matching time GMT is iterative based, in which following primary steps "$S1_p$" to "$S6_p$" of the curve matching algorithm CMA (cf. FIG. 3) are carried out, wherein the steps "$S3_p$" to "$S5_p$" are done iteratively.

In a first primary step "$S1_p$" the power production measurement signal "P(t)" PPMS with the set of power production measurement values "P($t_0$)" to "P($t_n$)" SPPMV and the irradiation measurement signal "I(t)" IMS with the set of irradiation measurement values "I($t_0$)" to "I($t_n$)" SIMV are fed to the curve matching algorithm CMA (cf. FIG. 3).

In a next second primary step "$S2_p$" a candidate set $CS_{GM}$ for good matching to the recording time "[$t_0$ to $t_n$]" are set.

In a further third primary step "$S3_p$" a scaling factor "s" SF by solving a first optimization problem OPP1 to $$\min_s \sum_{t \in \text{candidate set}} (P(t) - sI(t))^2$$

is calculated.

Then, in a fourth primary step "$S4_p$" time points from the candidate set for good matching $CS_{GM}$ are included, wherein all of the following criteria between a "P(t)"-value and a "sI(t)"-value for "t" in the recording time "[$t_0$ to $t_n$]" are satisfied A deviation between the values is smaller than a first threshold value THV1

A difference of variabilities of the values is smaller than a second threshold value THV2.

Moreover, in a fifth primary step "$S5_p$" following the mentioned iteration it is going back to the third primary step "$S3_p$" until the candidate set for good matching ($CS_{GM}$) remains unchanged according to the fourth primary step "$S4_p$".

Finally, in a sixth primary step "$S6_p$" the at least one good matching time GMT corresponding to the candidate set $CS_{GM}$ is outputted after the last iteration of the fifth primary step "$S5_p$".

The result of this iterative approach is depicted in FIG. 4.

Furthermore—again according to the flowchart of the process to determine the energy loss in the course of energy balancing solar power plants in the FIG. 3—for extending the cited energy balancing of the solar power plant SPP the energy balancing engine EBE formed by the processor PRC and the program module PGM is designed advantageously such that the robust least squares fit algorithm RLSFA (cf. FIG. 3) as an advantageous form of the fitting algorithm FA to generate grt the parameter set "K" PMS with the at least one parameter "[$k_0$, $k_1$, . . . ]" PM is preferably also iterative based, in which following secondary steps "$S1_S$" to "$S5_S$" of the robust least squares fit algorithm RLFSA (cf. FIG. 3) are carried out, wherein the steps "$S2_S$" to "$S4_S$" are done iteratively.

In a first secondary step "$S1_S$" the "good matching time"-related part of the power production measurement signal "$P_{GMT}(t)$" $PPMS_{GMT}$ with the subset of the set of power production measurement values "$P(t_0)$" to "$P(t_n)$" $SPPMV_{SS}$ and the "good matching time"-related part of the irradiation measurement signal "$I_{GMT}(t)$" $IMS_{GMT}$ on the subset of the set of irradiation measurement values "$I(t_0)$" to "$I(t_n)$" $SIMV_{SS}$ are fed into the robust least squares fit algorithm RLSFA (cf. FIG. 3).

In a next second secondary step "$S2_S$" a further parameter set "K*" PMS' by solving a second optimization problem OPP2 to $$K^* = \underset{K^*}{\operatorname{argmin}} \sum_{t \in \text{ good matching times}} (P(t) - P_{est}(t, K^*))^2$$

is calculated, wherein $P_{est}$ is a function of time "t" and the further parameter set "K*" PMS' with $P_{est}(t, K^*)=f(I(t), K^*)$".

In a further third secondary step "$S3_S$" the further parameter set "K*" PMS' is used to calculate a set of quadratic deviations SQD as $[(P(t)-P_{est}(t, K^*))^2 \ldots]$ for all "t∈ good matching times". Then also in this third secondary step "$S3_S$" a percentage share of the times, e.g., 10%, from the good matching times corresponding to the highest values in the set of quadratic deviations SQD are eliminated.

Moreover, in a fourth secondary step "$S4_S$" following the mentioned iteration it is going back to the second secondary step "$S2_S$" until a specified number of iterations, e.g., 3 iterations, is achieved.

Finally, in a fifth secondary step "$S5_S$" the parameter set "K" PMS corresponding to the further parameter set "K*" PMS' is outputted after the last iteration of the fourth secondary step "$S4_S$".

The result of this iterative approach is depicted in FIG. 5.

Alternatively, instead of using the latest parameter set "K" PMS from the fourth secondary step "$S4_S$" a historical parameter set "K" may be used to screen for partial failures of the component. If historical parameter set "K" jumped to lower values and remained at such low values until to the robust least squares fit algorithm evaluation, this means that a partial failure is present in the solar power plant during the robust least squares fit algorithm evaluation. In this case, the last parameter set "K" before the jump should be used to also estimate the energy losses due to constant partial failures, as well as intermittent failures.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for energy balancing solar power plants, by collecting for an energy accounting time period of a solar power plant, in which in which over a recording time "[$t_0$ to $t_n$]" with $n \in \mathbb{N}_0$ corresponding to the energy accounting time period, <i> regarding an irradiation, being based on a measured plane-of-array irradiation, by measuring an irradiation measurement signal, a set of irradiation measurement values and <ii> regarding a generated power, being based on a measured power of the solar power plant or at least one part of the solar power plant including an inverter, a photovoltaic string, or a measurement device, by measuring a power production measurement signal wherein:

a) matching for the recording time the power production measurement signal to the irradiation measurement signal by using a curve matching algorithm to identify based on the set of power production measurement values and the set of irradiation measurement values being collected at least one good matching time, in which the power production measurement signal and the irradiation measurement signal match optimally through a minimum signal distance, b) running a fitting algorithm for the at least one good matching time and based <i> regarding a good matching time-related part of the power production measurement signal on a subset of the set of power production measurement values and <ii> regarding a good matching time-related part of the irradiation measurement signal on a subset of the set of irradiation measurement values to generate according to an estimated power production measurement signal defined as a function "f(I(t),K)" with "$P_{est}(t, K)=f(I(t), K=[k0, k1, \ldots])$ a parameter set "K" with at least one parameter "[$k_0$, $k_1$, . . . ]", in which when running the fitting algorithm a deviation between the power production measurement signal and the estimated power production measurement signal is minimized by tuning or changing the parameter set "K", c) calculating for the recording time based on <1> the set of power production measurement values, <2> the set of irradiation measurement values and <3> the generated parameter set "K" with the at least one parameter "[$k_0$, $k_1$, . . . ]" the estimated power production measurement signal in order to determine a value for an energy loss by an integral calculation of a power difference $$\int [P_{est}(t, K) - P(t)]dt.$$

d) generating, based on the determined value for the energy loss, control information that is transmitted via a power plant interface to the solar power plant to control reductions of impacts concerning the calculated energy loss on the solar power plant.

2. The computer-implemented method according to claim 1, wherein the curve matching algorithm to identify the at least one good matching time is iterative based, in which following primary steps "$S1_p$" to "$S6_p$" of the curve matching algorithm are carried out, wherein the steps "$S3_p$" to "$S5_p$" are done iteratively "$S1_p$": Feeding to the curve matching algorithm the power production measurement signal with the set of power production measurement values and the irradiation measurement signal with the set of irradiation measurement values, "$S2_p$": Setting a candidate set for good matching to the recording time, "$S3_p$": Calculating a scaling factor "s" by solving a first optimization problem (OPP1) to $$\min_{s} \sum_{t \in candidate\ set} (P(t) - sI(t))^2,$$

"$S4_p$": Including time points into the candidate set for good matching, wherein all of the following criteria between a "P(t)"-value and a "sI(t)"-value for "t" in the recording time are satisfied A deviation between the values is smaller than a first threshold value A difference of variabilities of the values is smaller than a second threshold value, "$S5_p$": Going back to the primary step "$S3_p$" until the candidate set for good matching remains unchanged according to the primary steps "$S4_p$", "$S6_p$": Output of the at least one good matching time corresponding to the candidate set after the last iteration of the primary step "$S5_p$".

3. The computer-implemented method according to claim 1, wherein the fitting algorithm is a robust least squares fit algorithm to generate the parameter set "K" with the at least one parameter "[$k_0$, $k_1$, . . . ]" is iterative based, in which following secondary steps "$S1_S$" to "$S5_S$" of the robust least squares fit algorithm are carried out, wherein the steps "$S2_S$" to "$S4_S$" are done iteratively "$S1_S$": Feeding to the robust least squares fit algorithm the good matching time-related part of the power production measurement signal "Pour" with the subset of the set of power production measurement values and the good matching time-related part of the irradiation measurement signal on the subset of the set of irradiation measurement values, "$S2_S$": Calculating a further parameter set "K*" by solving a second optimization problem (OPP2) to $$K^* = \underset{K^*}{\operatorname{argmin}} \sum_{t \in good\ matching\ times} (P(t) - P_{est}(t, K^*))^2,$$

wherein $P_{est}$ is a function of time "t" and the further parameter set "K*" with $P_{est}(t, K^*)=f(I(t), K^*)$"

"$S3_S$": Using the further parameter set "K*" to calculate a set of quadratic deviations as $[(P(t)-P_{est}(t, K^*))^2 \ldots]$ for all t∈good matching times, and eliminating a percentage share of the times from the good matching times corresponding to the highest values in the set of quadratic deviations, "$S4_S$": Going to the secondary step "$S2_S$" until a specified number of iterations is achieved, "$S5_S$": Output of the parameter set "K" corresponding to the further parameter set "K*" after the last iteration of the secondary step "$S4_S$".

4. The computer-implemented method according to claim 1, wherein the function "f(I(t),K)" with K=[$k_0$, $k_1$, . . . ] the estimated power production measurement signal "$P_{est}$(t, K)" ($PPMS_{est}$) is calculated by is a linear function "$P_{est}(t, k_0)=I(t)$" or a quadratic function "$P_{est}(t, k_0, k_1)=k_0 I(t)+k_1 I(t)^2$".

5. The computer-implemented method according to claim 1, wherein the control information is used to adapt setpoints of the solar power plant or to adjust a maintenance schedule of the solar power plant.

6. A computer-implemented tool, for energy balancing solar power plants, wherein for an energy accounting time period of a solar power plant, in which over a recording time with $n \in \mathbb{N}_0$ corresponding to the energy accounting time period, <i> regarding an irradiation, being based on a measured plane-of-array irradiation, by measuring an irradiation measurement signal, a set of irradiation measurement values and <ii> regarding a generated power, being based on a measured power of the complete solar power plant or at least one part of the solar power plant including an inverter, a photovoltaic string or a measurement device, by measuring a power production measurement signal a set of power production measurement values are collected, wherein:

a non-transitory, processor-readable storage medium having processor-readable program-instructions of a program module to energy balance solar power plants stored in the non-transitory, processor-readable storage medium and a processor connected with the storage medium executing the processor-readable program-instructions of the program module to energy balance solar power plants, wherein the program module and the processor form an energy balancing engine to:

a) match for the recording time the power production measurement signal to the irradiation measurement signal by using a curve matching algorithm to identify based on the set of power production measurement values and the set of irradiation measurement values being collected at least one good matching time, in which the power production measurement signal and the irradiation measurement signal match optimally through a minimum signal distance, b) run a fitting algorithm for the at least one good matching time and based <i> regarding a good matching time-related part of the power production measurement signal on a subset of the set of power production measurement values and <ii> regarding a good matching time-related part of the irradiation measurement signal on a subset of the set of irradiation measurement values to generate according to an estimated power production measurement signal "$P_{est}$(t, K)" defined as a function "f(I(t),K)" with "$P_{est}$(t, K)=f(I(t), K=[k0, k1, . . . ]) a parameter set "K" with at least one parameter "[$k_0$, $k_1$, . . . ]", in which when running the fitting algorithm a deviation between the power production measurement signal and the estimated power production measurement signal "$P_{est}$(t, K)" is minimized by tuning or changing the parameter set "K", c) calculate for the recording time based on <1> the set of power production measurement values, <2> the set of irradiation measurement values and <3> the generated parameter set "K" with the at least one parameter "[$k_0$, $k_1$, . . . ]" the estimated power production measurement signal "$P_{est}$(t, K)" in order to determine a value for an energy loss by an integral calculation of a power difference $$\int [P_{est}(t, K) - P(t)]dt.$$

d) generate, based on the determined value for the energy loss, control information that is transmitted via a power plant interface to the solar power plant to control reductions of impacts concerning the calculated energy loss on the solar power plant.

7. The computer-implemented tool according to claim 6, wherein the energy balancing engine is designed such that the curve matching algorithm to identify the at least one good matching time is iterative based, in which following primary steps "$S1_p$" to "$S6_p$" of the curve matching algorithm are carried out, wherein the steps "$S3_p$" to "$S5_p$" are done iteratively "$S1_p$": Feeding to the curve matching algorithm the power production measurement signal with the set of power production measurement values and the irradiation measurement signal with the set of irradiation measurement values, "$S2_p$": Setting a candidate set for good matching to the recording time, "$S3_p$": Calculating a scaling factor "s" by solving a first optimization problem to $$\min_s \sum_{t \in \text{candidate set}} (P(t) - sI(t))^2,$$

"$S4_p$": Including time points into the candidate set for good matching, wherein all of the following criteria between a "P(t)"-value and a "sI(t)"-value for "t" in the recording time are satisfied A deviation between the values is smaller than a first threshold value A difference of variabilities of the values is smaller than a second threshold value, "$S5_p$": Going back to the primary step "$S3_p$" until the candidate set for good matching remains unchanged according to the primary steps "$S4_p$", "$S6_p$": Output of the at least one good matching time corresponding to the candidate set after the last iteration of the primary step "$S5_p$".

8. The computer-implemented tool according to claim 6, wherein the fitting algorithm is a robust least squares fit algorithm and the energy balancing engine is configured such that the robust least squares fit algorithm to generate the parameter set "K" with the at least one parameter "[$k_0$, $k_1$, . . . ]" is iterative based, in which following secondary steps "$S1_S$" to "$S5_S$" of the robust least squares fit algorithm are carried out, wherein the steps "$S2_S$" to "$S4_S$" are done iteratively "$S1_S$": Feeding to the robust least squares fit algorithm the good matching time-related part of the power production measurement signal with the subset of the set of power production measurement values and the good matching time-related part of the irradiation measurement signal on the subset of the set of irradiation measurement values, "$S2_S$": Calculating a further parameter set "K*" by solving a second optimization problem to $$K^* = \underset{K^*}{\operatorname{argmin}} \sum_{t \in \text{good matching times}} (P(t) - P_{est}(t, K^*))^2,$$

wherein $P_{est}$ is a function of time "t" and the further parameter set "K*" with $P_{est}(t, K^*)=f(I(t), K^*)$"

"$S3_S$": Using the further parameter set "K*" to calculate a set of quadratic deviations as $[(P(t)-P_{est}(t, K^*))^2 \ldots]$ for all $t \in$ good matching times, and eliminating a percentage share of the times from the good matching times corresponding to highest values in the set of quadratic deviations, "$S4_S$": Going to the secondary step "$S2_S$" until a specified number of iterations is achieved, "$S5_S$": Output of the parameter set "K" corresponding to the further parameter set "K*" after the last iteration of the secondary step "$S4_S$".

9. The computer-implemented tool according to claim 6, wherein the function "f(I(t),K)" with $K=[k_0, k_1, \ldots]$ the estimated power production measurement signal "$P_{est}(t, K)$" is calculated by is a linear function "$P_{est}(t, k_0)=I(t)$" or a quadratic function "$P_{est}(t, k_0, k_1)=k_0I(t)+k_1I(t)^2$".

10. The computer-implemented tool according to claim 6, wherein the energy balancing engine is configured such that he control information is used to adapt setpoints of the solar power plant or to adjust a maintenance schedule of the solar power plant.

11. A power plant control device for energy balancing solar power plants with a control unit connected to a solar power plant for controlling the solar power plant, to adapt setpoints of the plant or to optimize a maintenance schedule, wherein a computer-implemented tool according to claim 6 either being implemented as a sub-unit in the control unit or forming a functional unit with the control unit, such that the computer-implemented tool is loadable into the control unit or forms either a cloud-based, centralized platform for the power plant control device or a decentralized platform for the power plant control device, for carrying out the method.

12. A solar power plant system including a solar power plant, which is controlled to adapt setpoints of the plant or to optimize a maintenance schedule of the plant, wherein a power plant control device for energy balancing solar power plants according to claim 11, which in the course to control the solar power plant is connected to the solar power plant and configured such that the computer-implemented method is carried out.

* * * * *